United States Patent [19]

Yonkers

[11] Patent Number: 5,144,323
[45] Date of Patent: Sep. 1, 1992

[54] PROTECTED SWITCH FOR EMERGENCY LOCATION SYSTEM

[75] Inventor: E. Hubbard Yonkers, Contoocook, N.H.

[73] Assignee: Tendler Technologies, Inc., Chestnut Hill, Mass.

[21] Appl. No.: 703,927

[22] Filed: May 22, 1991

[51] Int. Cl.⁵ .................... G01S 1/08; H01H 13/04; H01H 9/20

[52] U.S. Cl. .................... 342/386; 200/333; 200/334

[58] Field of Search ........... 200/333, 334, 345, 341, 200/332.2; 342/385, 386; 381/169; 455/89, 90

[56] References Cited

U.S. PATENT DOCUMENTS

| | | | |
|---|---|---|---|
| 2,348,393 | 5/1944 | Krieger | 200/334 |
| 3,317,698 | 5/1967 | Mansfield | 200/333 |
| 4,057,794 | 11/1977 | Grossfield | 200/333 |
| 4,394,552 | 7/1983 | Schlosser | 200/333 |
| 4,547,778 | 10/1985 | Hinkle | 342/456 |
| 4,748,685 | 5/1988 | Rozanski, Jr. | 455/218 |

*Primary Examiner*—Gregory C. Issing
*Attorney, Agent, or Firm*—Robert K. Tendler

[57] ABSTRACT

An emergency vessel or vehicle location system (EVLS) is provided with a protected mayday switch for controlling the transceiver or module to which it is attached, so as to permit activation of the emergency vessel location system by use of a switch, in one embodiment, on the same microphone used for two-way communication. The protection of the mayday switch is provided by a specialized transparent latch in which the latch is spring loaded over the mayday switch such that accidental depression of the mayday switch is prevented, while permitting viewing of the switch legend through the transparent latch. The protected switch may be used on the microphone, on an auxiliary unit, or on the transceiver itself.

8 Claims, 5 Drawing Sheets

"MAYDAY, MAYDAY BOAT REGISTRATION NUMBER MS4757T POSITION - 42.21.50 NORTH BY 71.01.10 WEST."

PROTECTED SWITCH FOR EMERGENCY LOCATION SYSTEM

FIELD OF THE INVENTION

This invention relates to an emergency vessel location system and more particularly to the provision of protection for a mayday switch used to activate the system.

BACKGROUND OF THE INVENTION

As discussed in U.S. Pat. No. 4,833,477, issued to Robert K. Tendler on May 23, 1989, incorporated herein by reference, an emergency vessel or vehicle location system is described in which a mayday message is broadcast via conventional transceivers to all within the broadcast range, with the mayday message including the position of the stricken vessel or vehicle. The EVLS system described in the Tendler patent is not limited to vessels or vehicles but may be provided as a unit which is personally carried and is adaptable to hikers or military personnel regardless of their being in a vehicle or not.

One of the problems associated with such radios or modules is the provision of a protected emergency switch for activating the system. A protected switch, in the context of the subject invention, is one which requires two motions or two hands in order to achieve activation. This prevents accidental activation which would create intolerable incidences of false alarms.

SUMMARY OF THE INVENTION

In one embodiment, the protected switch to be described hereinafter is placed on the microphone used with the transceiver. The omnipresent microphone along with its extensible microphone cord, provides a unique opportunity to provide an easily accessible protected switch to control the transceiver. However, placing the mayday switch on the microphone is troublesome because it is so readily accessible. Thus, there is a need for a switch protection system which is effective but does not limit visibility of the indicia or markings on the switch itself.

In order to accomplish switch protection, regardless of where the switch is located, a spring loaded transparent latch-protected switch configuration is provided in which the mayday legend can be viewed through the transparent portion of the overlying latch lever that must be raised prior to depressing the mayday switch. In general the protected switch includes overlying the switch with a non-frangible removable transparent member, the function of which is to permit viewing of the switch legend when in the overlying position, while at the same time preventing switch activation until the member is removed or moved out of the way, either by rotation, sliding, or other removal not involving breaking of the protective member.

Activating the mayday button or switch on the microphone, in one embodiment, turns on the two-way radio, turns the radio to the emergency channel, and initiates the verbal mayday broadcast which, inter alia, provides the identity of the vessel or vehicle involved followed by its location. Placing the protected switch on the microphone not only adds convenience, it directs the individual activating the system to the utilization of the microphone which upon activation of the Push-To-Talk switch returns the two-way radio to its normal transceiver function. Locating the protected switch on the microphone as opposed to the radio eliminates the necessity of reconfiguring the face of the radio to provide the emergency vessel location function.

BRIEF DESCRIPTION OF THE DRAWINGS

These and other features of the subject invention will be better understood taken in conjunction with the Detailed Description in conjunction with the Drawings of which.

DETAILED DESCRIPTION

Figures 1A, 1B:
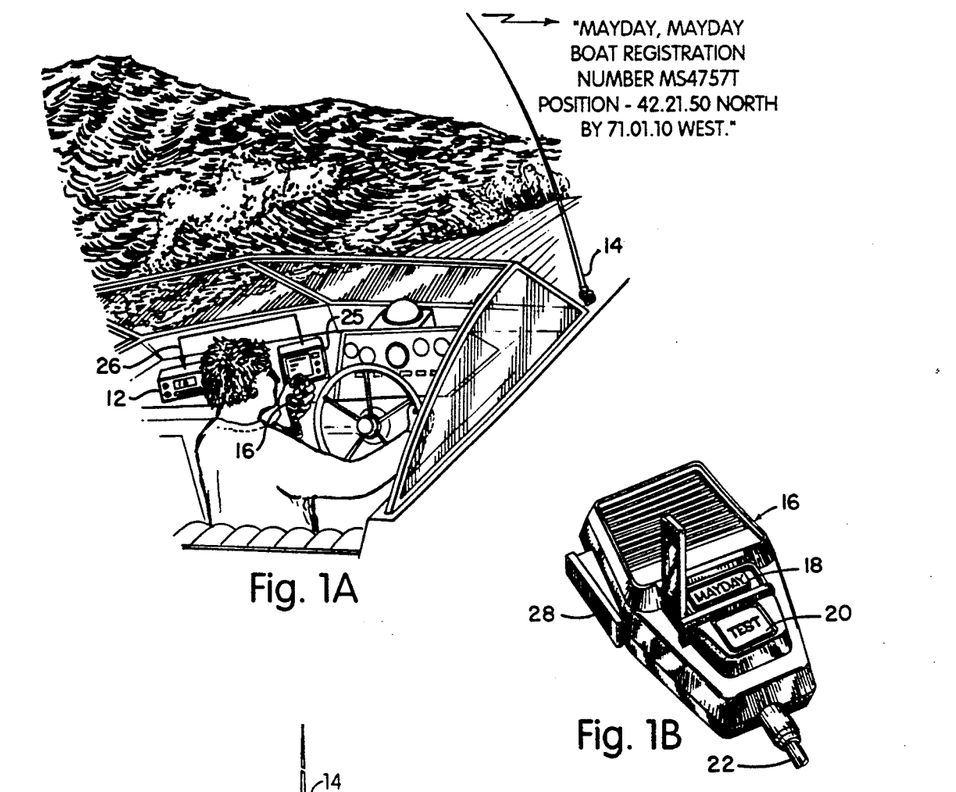
FIGS. 1a and 1b are a diagrammatic representation of the utilization of a mayday microphone with a protected switch thereon showing its control of a marine transceiver during an emergency situation involving rough seas in which activation is accomplished simply through depressing the mayday button or switch on the microphone.

Referring now to FIGS. 1a and 1b, a vessel generally indicated by reference numeral 10 is shown to be in distress, with the vessel being provided with a VHF radio transceiver 12 coupled to an antenna 14 to which is coupled a mayday microphone 16 having thereon a protected switch 18 to initiate the aforementioned mayday function. Underneath the switch is a test button or switch 20, the function of which will be described hereinafter. The mayday microphone 16 is coupled to transceiver 12 via a cord 22, with the transceiver being provided by power as indicated by arrow 24. The present position in terms of latitude and longitude is provided via an onboard navigation unit (not shown) coupled to the transceiver as illustrated by arrow 26. Navigation units include LORANS, GPS units, OMEGA systems, and other satellite navigation systems, all of which commonly produce an NMEA 0183 digital output representing the latitude and the longitude detected.

As will be described, specialized circuitry is provided within transceiver 12 which, upon actuation of the mayday switch 18, causes the transceiver to be turned on, tuned to an emergency channel such as VHF channel 16, and to commence a mayday broadcast in the traditional form: "mayday, mayday, boat registration number MS4757T, position 42.21.50 north by 71.01.10 west."

It will be appreciated that such a broadcast is indeed useful to summon help because not only is the identity of the boat made known verbally, also the latitude and longitude is verbalized and transmitted so that it can be received by any conventional receiver tuned to this emergency channel.

As will be discussed, such a system is described in the aforementioned U.S. Pat. No. 4,833,477. However, it will be appreciated that activation of such a system must be simple and readily available when an emergency situation occurs.

The subject system contemplates placing the activation switches or buttons on the self-same microphone utilized to control the transceiver such that upon activation of the protected switch on the microphone, the transceiver is caused to be placed in its transmit mode.

Microphone 16 is also provided with a push to talk switch or lever 28 which, when depressed or actuated, causes transceiver 12 to be placed in its normal transmit mode, inhibiting any mayday broadcast. Thus, the Push-To-Talk button on the microphone enables the mayday microphone to be used in the normal manner to initiate two-way communication.

The Push-To-Talk button, assuming a mayday broadcast has been initiated, instantly upon depression, causes the mayday broadcast to cease while at the same time enabling the operator of the microphone to speak directly in the microphone and have his message broadcast in lieu of the mayday message.

What will be seen is that by placing the protected switch on the microphone, all functions required during an emergency situation may be performed directly at the microphone, rather than having the individual depress a protected switch located elsewhere, and not presumably readily at hand as is the microphone.

The convenience and in fact necessity of having the protected mayday switch on the microphone comes from the fact that the microphone is a uniquely recognizable instrument. Placing the switches for instituting the mayday broadcast on the microphone enables the individual instituting the mayday broadcast instant access to two-way communications as required by the Coast Guard and other rescue agency or individual.

Figure 2:
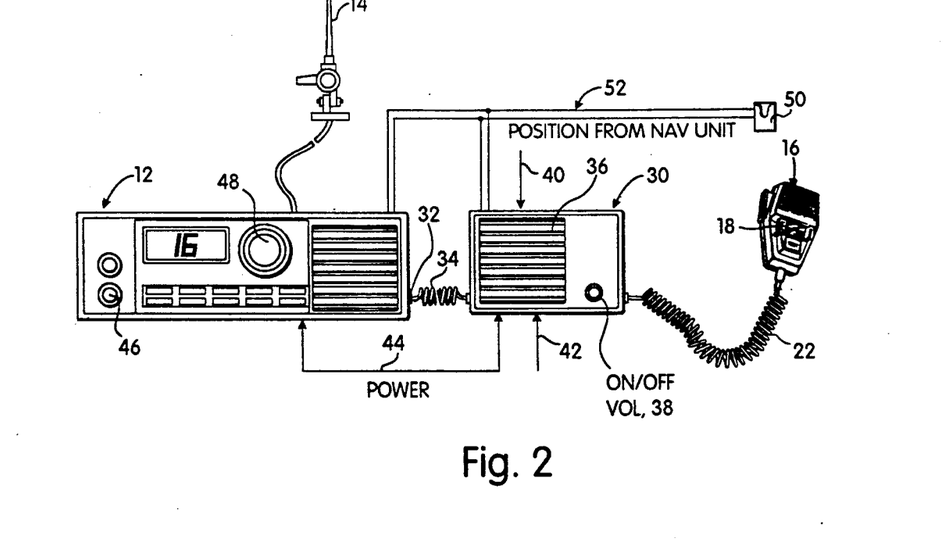
FIG. 2 is a diagrammatic representation of the utilization of the aforementioned mayday microphone in combination with a mayday module coupled to a transceiver, in which control of the transceiver is accomplished through the utilization of the mayday module in combination with the mayday microphone.

Referring now to FIG. 2, transceiver 12 may, instead of being provided with the mayday microphone directly, be provided with a mayday module 30 which is an add-on unit that communicates with the transceiver primarily through the microphone connector 32 on the transceiver and a cable 34 connected between the VHF radio and the output of the mayday module. In this instance the mayday module is provided with a speaker 36 and an on/off volume control 38, such that upon depression of the mayday button 18, the mayday module takes control of the transceiver through its mike connector to modulate the transmitter of the transceiver with the required mayday message. Here as can be seen via arrow 40 the position from a navigation unit (not shown) is supplied, in this embodiment to the mayday module as opposed to the transceiver. Power as indicated by arrow 42 is applied to the module, from which power is supplied via line 44 to the transceiver.

In adapting an existing transceiver to be controlled by the mayday module, the transceiver is normally left "on" by appropriately positioning its on/off volume control 46; and is tuned, in one embodiment, to VHF channel 16 or another emergency channel via its channel selection knob 48.

Alternatively, mayday module 30 may control the channel to which the transceiver is tuned by virtue of providing a signal to the transceiver which is coupled to the transceiver by the channel 16 line from the transceiver's case. In one embodiment, the transceiver is automatically tuned to channel 16 by virtue of hanging up its own microphone on its bracket. This microphone hang up bracket is shown by reference character 50, with parallel connections thereto going to mayday module 30 via line 52.

In operation, upon depression of the mayday switch, the mayday module applies power to transceiver 12 which, by virtue of having been set to channel 16 returns to channel 16 when powered up. Thereafter, the mayday message is verbalized and transmitted over cord 34 to microphone connector 32 which modulates the transmitter portion transceiver 12 to establish the mayday message that includes the boat registration number and the latitude and longitude as detected by the aforementioned navigation unit.

Alternatively, total control of the transceiver may be accomplished from the module through retrofitting the transceiver's microphone connector with a multipin connector and wiring this new connector to appropriate portions of the transceiver circuitry. Thus, channel control, on/off control, deactivation of scrambling, initial channel tuning to DSC channel 70, removal of the mayday broadcast to some other channel, and message test audio can be controlled by the mayday module through the multipin microphone connector on the transceiver.

It will be appreciated that rather than putting the mayday control switches on the mayday unit, again, as was the case in FIG. 1, the mayday switch is directly located on the microphone so as to eliminate the problem of user unfamiliarity with the equipment and the problem of hunting around for such a button either on the transceiver or on the mayday module.

It will be appreciated that in addition to the above advantages of placing the mayday button on the microphone used for two-way communications, at least insofar as the FIG. 1 embodiment is concerned, the case of the VHF transceiver need not be reconfigured to give the transceiver the emergency vessel location mayday function.

Figure 3:
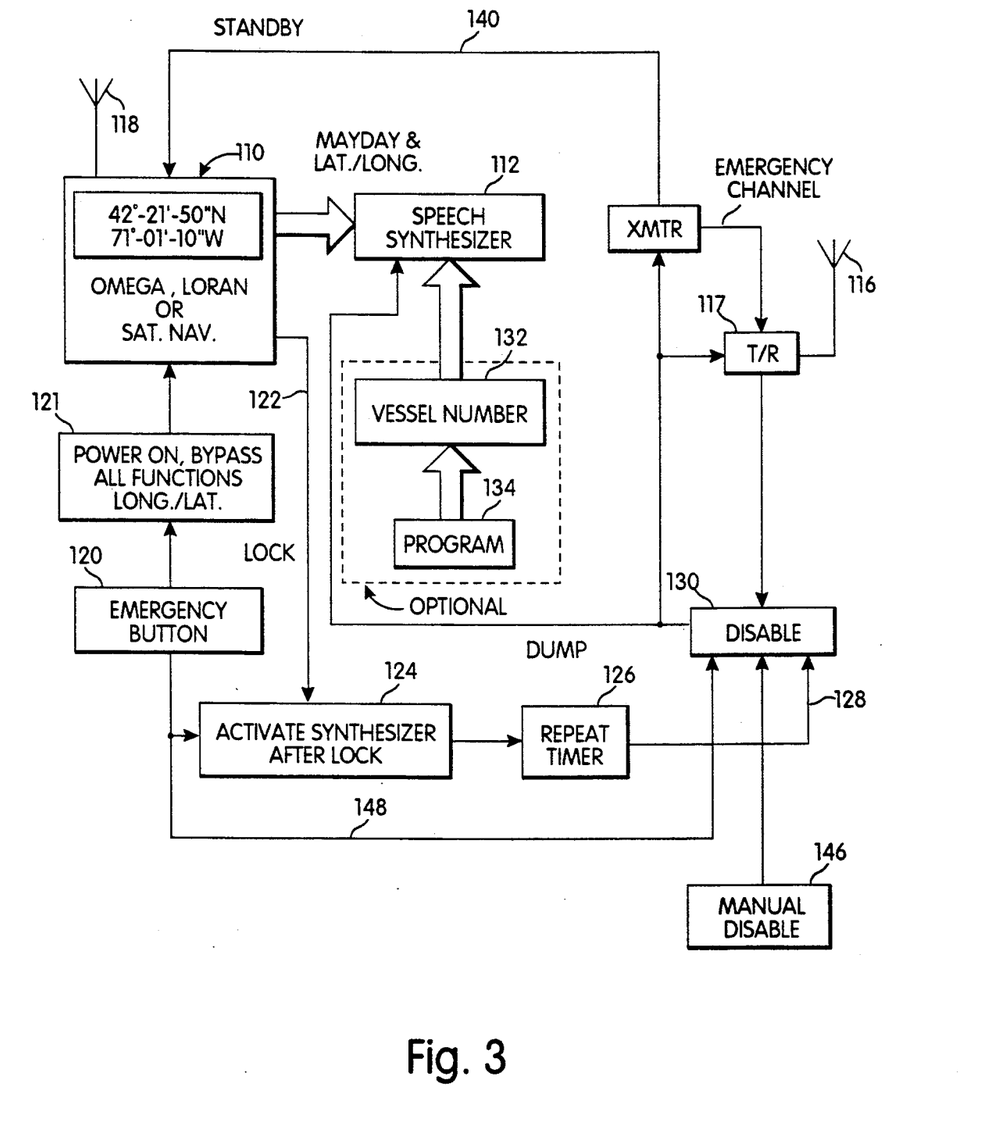
FIG. 3 is a block diagram of an emergency vessel location system which is to be utilized in combination with the mayday microphone of FIG. 1.

As to general operation, and as described in the aforementioned U.S. patent, a navigational unit 110 which may be an OMEGA, a LORAN, or satellite navigation unit has, as an output thereof the latitude and longitude of the location of the vessel on which the navigation unit is mounted. In the usual case this unit, which may be a stand-alone unit, has a number of front panel switches in order to provide for instance way points, steering information, and other types of information which are not necessary or desirable for one to know during an emergency situation. The latitude and longitude is provided by the naviqation unit after the navigation unit has acquired the appropriate signals and is locked onto the signals.

In the case of hyperbolic navigation systems such as an OMEGA or LORAN system, the first information acquired is the so-called time difference between pairs of stations or a T.D. While it is possible that T.D.s qualify as geometric coordinates for the unit through the utilization of Campbell's routine, these time differences are readily converted into latitude and longitude. Presently, the latitude and longitude are available as an output of these units through the NMEA 0183 format.

The output of the navigation unit is applied to a speech synthesizer 112 which has an internal read only memory (ROM) in which is stored the term "mayday" and a large number of latitudes and longitudes which, when accessed by the output of the navigation unit causes the speech synthesizer portion of the unit to read out first a "mayday" message followed by the geometric coordinates to a transmitter 114 coupled to an antenna 116 via T-R switch 117 under the control of a dump signal to be described hereinafter. The T/R switch is normally in the receive position when the unit is not transmitting. The transmission to a remote location of the latitude and longitude is read out from the navigation unit through the synthesizer to the transmitter which is keyed on with the pushing of an emergency button 120.

Emergency button 120 activates unit 121 which powers on the navigation unit and bypasses all functions except the latitude/longitude function. Alternatively, if the navigation unit is already on, as contemplated in the subject case, this button places the navigation unit in the latitude/longitude mode. This too may be automatically done and need not be accomplished during the depression of the emergency button. It will be appreciated that the emergency button also activates a synthesizer activation unit 124 which activates synthesizer 112 after lock has been achieved at the navigation unit. This lock can be assumed, assuming that the navigation unit is on at the time of emergency activation. In one embodiment, the lock is achieved and is provided over line 122 to unit 124. The output of unit 124 is applied to repeat timer 126 which repeatedly generates a dump pulse over line 128 through a disable circuit 132 to speech synthesizer 112. Optionally, speech synthesizer 112 may be provided with a vessel name, type and color, or other information entered from a memory 132 having a programming unit 134.

Figure 4:
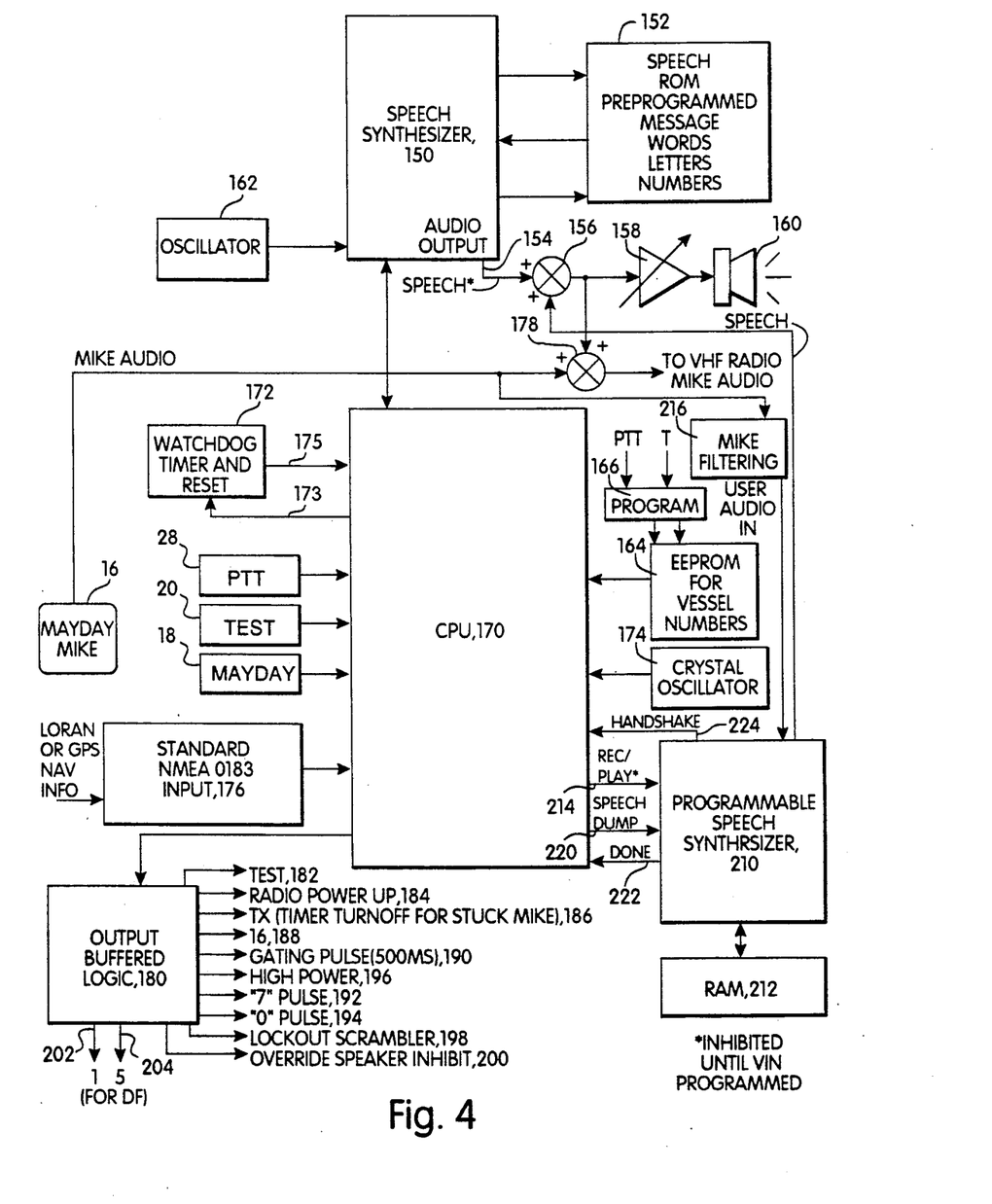
FIG. 4 is a block diagram of a system for the control of the VHF transceiver of FIG. 1 or the mayday module of FIG. 2, illustrating control and programming functions accomplished through the utilization of the mayday microphone of FIG. 1.

As specifically adapted to the marine environment, and referring now to FIG. 4, in one embodiment the EVLS system includes a first speech synthesizer 150 coupled to a speech ROM 152 which provides pre-program message words, letters, and numbers upon appropriate access to the speech synthesizer which synthesizes a message provided at its audio output 154 to a summing network 156 and thence to a variable gain amplifier 158 which is in turn outputted to a speaker 160. At appropriate timing oscillator 162 is coupled to the speech synthesizer and serves as the system clock.

The speech synthesizer is available commercially as an OKI model MSM6376 speech chip, whereas the speech ROM is either carried outboard of the speech chip or is integrated as part of the masked integrated circuit.

Pre-program words, letters, and numbers are limited to the size of the ROM and in general for the limited purposes of identifying latitude and longitude as well as boat registration number, may be limited to a word such as mayday, the letters of the alphabet, and numbers as well as a few words such as "position".

The audio output 154 is in general inhibited until such time as an appropriate vessel identification number or vin is entered into an EEPROM 164 via a program 166 which is used to verbalize in a scroll fashion both letters of the alphabet and numbers under the control of PTT and test buttons mentioned previously. Verbal scroll initiated via a CPU 170 which is coupled to speech synthesizer 150 for the outputting of the scrolled speech at speaker 160 during the initial programming process.

As is common, CPU 170 is provided with a watch dog timer and reset circuit 172 and with its own timing oscillator 174.

CPU 170 may be, in one embodiment, an 80C51 which can be masked as appropriate to provide for the programming of the EVLS unit. In general such an 8051 CPU would include a number of I/O ports, at least one PROM, at least one RAM, timers and interrupts, as well CPU and address data busses. Additionally, the 8051 can be configured to perform a UART RXD and TXD function for receiving and transmitting ASCI data as would be available from a standard NMEA 0183 input here illustrated at 176 to be providing to the CPU navigation information from a LORAN, GPS, SAT-NAV, OMEGA, or any other geopositioning unit which has this standardized output.

The aforementioned mayday microphone 16 is shown connected to a summing junction 178 with its output summed with the output of summing junction 156 as illustrated, the purpose of which is to provide mike audio or synthesized audio to the modulation section of a VHF transceiver, or for that matter any transmitter. Mayday, test, and Push-To-Talk switches respectively 18, 20, and 28 on mayday microphone 16 are Coupled to CPU 170 as shown so as to enable the control of the EVLS unit as will be described.

In addition to providing synthesized speech to the transmitter of a VHF transceiver, it is important to control other functions of the VHF transceiver and for this purpose an output of CPU 170 is coupled to an output buffered logic circuit 180 which has the indicated outputs. A signal from the test output line 182 is utilized to capture the audio section of the VHF transceiver to be able to provide audio output of speech synthesizer 150 without powering up the transmitter, thereby to verify the mayday message and position. It is possible to actuate this test line initially to produce the entire mayday message followed by repetitions of the latitude and longitude only to provide a navigator with a regular latitude and longitude update of an oral nature. The transceiver powerup line 184 is utilized to turn power onto the VHF transceiver upon depression of the mayday switch. A TX line 186 is utilized as a Push-To-Talk signal which, under control of a timer within CPU 170 automatically turns off the Push-To-Talk signal after a given period of no modulation, or alternatively after a specific time-out time such as, for instance, five minutes. A channel 16 revert line 188 is provided with a signal upon depression of the mayday switch 18 which is utilized to tune the transceiver to the emergency channel upon depression of the mayday switch. A gating pulse 190 on the order of 500 milliseconds is utilized to permit the transceiver to first be tuned to channel 70 for 500 milliseconds to permit an FSK digital transmission of a mayday message, including latitude and longitude and VIN number via digital selective calling (DSC) protocols. A "7" pulse is provided over line 192 and a "0" pulse is provided over line 194 to effectuate initial switching to channel 70 prior to the verbal mayday being produced. A high power line 196 is provided to ensure that when the mayday button is pushed, the VHF transceiver is in its high power mode. A lockout scrambler line 198 is provided to defeat any scrambling that might be provided by the VHF transceiver, whereas an override speaker inhibit signal is provided over line 200 to permit verbal annunciation of the mayday message by the speaker in the VHF transceiver as the mayday is being transmitted.

This last signal provides for a verbal indication of the transmission of the mayday message to the operator of the vessel or vehicle so that he can ascertain the operation of the system during an emergency.

It has been suggested that the mayday message occur only twice at which point the system is to be reactivated by pressing the mayday button. Alternatively, the mayday message may be put on another emergency channel such as VHF channel 15 and for this purpose a "one pulse" and a "five pulse" is provided over lines 202 and 204.

The above has described a pre-programmed system utilizing the mayday microphone and a pre-programmed message to be broadcast along with the detected latitude and longitude. However, it may be desirable for the user to be able to program in his own speech the name of his vessel, the color of the vessel, the type of vessel, the names of people on board, or other useful information. Due to the limited size of speech ROM 152 such individual programming is not possible. However, by providing a programmable speech synthesizer 210 coupled to a RAM 212 and programmed via Mayday Mike 16 under the control of CPU 170, this additional information can be programmed in by the user on a daily basis into the programmable speech synthesizer 210. In order to accomplish this a record/play line 214 is provided which is activated only when the vessel identification number has been entered into the system. This assures, inter alia, that at least the vessel registration number is available during a mayday message. Assuming that this data has been permanently entered into the system, activation of the programmable speech synthesizer may proceed.

Under control of test button 20 in a sequence of predetermined actuations, programmable speech synthesizer 210 can be activated to receive mike audio through a mike filtering circuit 216. When the appropriate message has been loaded into the programmable speech synthesizer, its output may be provided to a summing junction or mixer 156 under control of the speech dump pulse 220. This speech dump pulse is generated only after speech synthesizer 150 has been actuated to output the initial mayday word plus the identity of the vessel and prior, in one instance, to the verbalization of the latitude and longitude. The speech dump pulse to programmable speech synthesizer 210 initiates the user-programmable portion of the mayday message which when completed is signalled over line 222 to CPU 170 and is thence utilized to activate speech synthesizer 150 to verbalize the latitude and longitude portion of the mayday message.

In this fashion either a pre-programmed mayday message is established or, in an alternative embodiment the standard message may be augmented by user-programmable messages.

It will be noted that a handshake signal is provided between CPU 170 and programmable speech synthesizer 210 via line 224.

In operation, the main system's logic is stored internally within the masked program memory in CPU 170. This CPU allows easy user programming of the vessel registration numbers; reads in the navigation data and addresses the speech synthesizer to vocalize the sounds corresponding to the mayday message including current vessel position; allows the user to program his custom vessel features for ease of identification; reads in the PTT, TEST and MAYDAY buttons or keys and activates system's logic accordingly; and controls the transceiver's audio and transmitter section.

Specifically, the power to the EVLS unit is constantly on, but in standby mode. This allows the user programmed message to be stored in a low current drain standby state in the programmable speech synthesizer RAM 212. CPU 170 monitors input 176 to see if navigation information is present. If there is none, the CPU goes into the low power state for a time-out period, and then rechecks for the signal. In this way, on a moments notice, transceiver 12 can be turned on and the last valid position vocalized immediately provided it is not too old.

Upon activation of MAYDAY button 18, the following actions occur. CPU 170 controls buffered logic 180 to produce a transmit pulse on line 186 which places transceiver 12 in the transmit mode, while turning transceiver 12 on via a signal on line 184. Transceiver 12 is turned to the emergency channel via a pulse on line 188. Also, all transceiver scrambling is inhibited by a signal on line 198, and the speaker inhibit circuit in the transceiver is overridden by a pulse on line 200. Moreover, at this time the transmitter section is keyed to the 25 watt mode by a gating pulse on line 196.

Then CPU 170 tests for a valid vessel registration number at input 176 and activates programmable speech synthesizer 150 to verbalize "mayday" and the vessel, vehicle, or other identification number carried in ROM 152. The vessel registration data address locations are read from EEPROM 164 as programmed at 166 via a speech scroll under the control of the PTT and TEST buttons and vocalized at the appropriate time. This audio from speech synthesizer 150 is coupled to mixer 156 which is in turn coupled to speaker 160 which may be located in transceiver 12 or may be an auxiliary speaker in an add-on module. The purpose of driving a speaker is to permit verification of the broadcast of the mayday message.

The output of mixer 156 is coupled to mixer 178 and is mixed with mike audio which is delivered to the modulation section of transceiver 12. After broadcast of the first portion of the mayday message which includes "mayday" followed by the vessel registration number, CPU 170 addresses programmable speech synthesizer 210, via the speech dump initiation signal 220. This provides a speech output to the mixer 156 coupled to the audio amplifier which drives speaker 160 within the transceiver. The output of mixer 156 is coupled to mixer 178 where it is combined with the mike audio signal. The output of mixer 178 drives the modulator of the transmitter section of transceiver 12.

As a result of the above action, both the fixed portion and the programmable portion of the mayday message has now been broadcast over the air, as well as a replica being vocalized over the transceiver's speaker itself.

Boat name, color and type may be programmed in by the operator of the vessel, as well as other information. Alternatively, the programmable portion of the system may be eliminated, as all essential information is vocalized by speech synthesizer 150.

Programmable speech synthesizer 210, when finished, generates a DONE command over line 222. This instructs CPU 170 to switch to speech synthesizer 150 which contains the vocalization data addresses for vessel position which is then broadcast. If there is no valid data, the mayday message is permitted to go out and a "no position" annunciation occurs so that at least the occurrence of a mayday situation is broadcast along with vessel identity. CPU 170 is cued when the message is complete and goes to the next stage logic.

A time-out process now begins. This unit is programmed to conform to Coast Guard regulations on the time interval between messages and the number of messages. The transmitter can also be programmed to remain ON during this interval for DF purposes. After the time-out interval, the process above repeats itself and the CPU goes into the standby mode until the next activation of the MAYDAY button.

Note, any time the PTT button is depressed, all speech synthesis functions are inhibited and mike audio is coupled to the modulator of the transmitter section within transceiver 12. Also, a TX pulse is applied to line 186 to place the transceiver in the transmit mode.

In one embodiment, once the MAYDAY button has been depressed the transceiver is powered up and stays powered up until disconnected from the battery by virtue of turning off the main battery switch. This is to prevent any accidental power down of the transceiver through its own ON/OFF switch. Thus emergency communications are assured after the mayday broadcast.

In another embodiment, the speaker either in the transceiver or the mayday module has no volume control. Rather a fixed relatively loud volume is preset, again so that no inadvertent action by an individual can defeat the aural announcement of the broadcast of the mayday message.

As to the TEST mode, when TEST button 20 is pushed, CPU 170 first activates speech synthesizer 150 to dump its audio contents to mixer 156 and thence to speaker 160. The TX pulse on line 186 is inhibited to prevent broadcast of the test message. All other outputs of output buffered logic 180 remain the same, including the override of the speaker inhibit circuit within transceiver 12.

CPU 170 therefore causes speech synthesizer 150 to dump "MAYDAY" and the identification number. If there is no programmable speech provision, synthesizer 150 goes on to dump the detected lat/lon coordinates. If programmable speech is available, CPU 170 inhibits speech synthesizer 150 after the identification number verbalization and activates programmable speech synthesizer 210 to dump the user-programmed speech to speaker 160.

Thereafter, CPU 170 inhibits the programmable speech synthesizer and activates speech synthesizer 150 to dump only the position information, and this at regular timed intervals to assist the navigator with regulator lat/lon callouts. A second push of the TEST button stops this sequence.

As to the watch dog timer, this circuit controls the reset pin of CPU 170. The watch dog circuit timer is preset with the time the software takes to execute the code properly. Every successful pass through the code by CPU 170 generates a trigger pulse over line 173. This pulse resets the watchdog timer on every other pass. If the trigger pulse is missing or stuck high, the timer automatically resets the CPU 170. This function prevents "stuck in a loop" or "going to invalid ROM addresses" anomalies.

Standard NMEA input 176 provides an optically-coupled input isolation method to read the 4800 baud NMEA 0183 standard digital bus from the navigation unit coupled to the EVLS system. The output of this device goes directly into the built-in UART within the CPU itself. A timer within the CPU establishes the communication formats. A self-diagnostic software program within CPU 170 determines the baud rate and the proper phase of the incoming signal to assure proper decoding of the vessel position labels and data. This is accomplished by sampling the incoming signal for several seconds to ascertain if there is any valid code coming in. If not, polarity is reversed and a code check is made. This accommodates NMEA 0183 data regardless of polarity. The data string is thus analyzed for the status bits associated with an invalid position input. Old stored position data is also analyzed for usefulness. If no useful data is available, CPU 170 provides that a message of "No Position" is broadcast.

As to the output buffered logic 180, signals on TEST line 182 control the inhibit of the transmitter in test mode. Signals on line 184 control transceiver power up to turn it on automatically. Signals on line 186 provide for the keying of the transmitter section within transceiver 12. Moreover, a timer in CPU 170 results in the removal of the TX signal after five minutes of continuous PTT push. Letting up on PTT and activating again restarts the timer. A signal on line 188 automatically channels the transceiver to the emergency channel 16. A signal on line 190 serves as a gating pulse which allows for future growth to accommodate DSC units by permitting a 500 microsecond delay to permit FSK signalling over VHF channel 70, the digital selective calling channel. A signal on line 196 assures the mayday message is transmitted at high power. A signal on line 192 provides the first digit to allow the transceiver to be channeled to VHF channel 70. A signal on line 194 provides the second digit for the channel 70 selection. A signal on line 198 permits disabling any scrambler function which may be provided in some models to assure recognizable high quality voice is always transmitted properly. A signal on line 200 permits overriding the speaker inhibit normally used when a transceiver is placed in its transmit mode. This signal allows the transceiver to vocalize the audio signal while simultaneously transmitting. Finally, signals on lines 202 and 204 permit accessing VHF channel 15 so that the mayday message may be continuously transmitted on a spare channel after initially being placed on the emergency channel. The use of a spare channel also permits direction finding on the signal on this channel as the signal may be left on for a more extended period of time than that permitted on the emergency channel.

Figure 5:
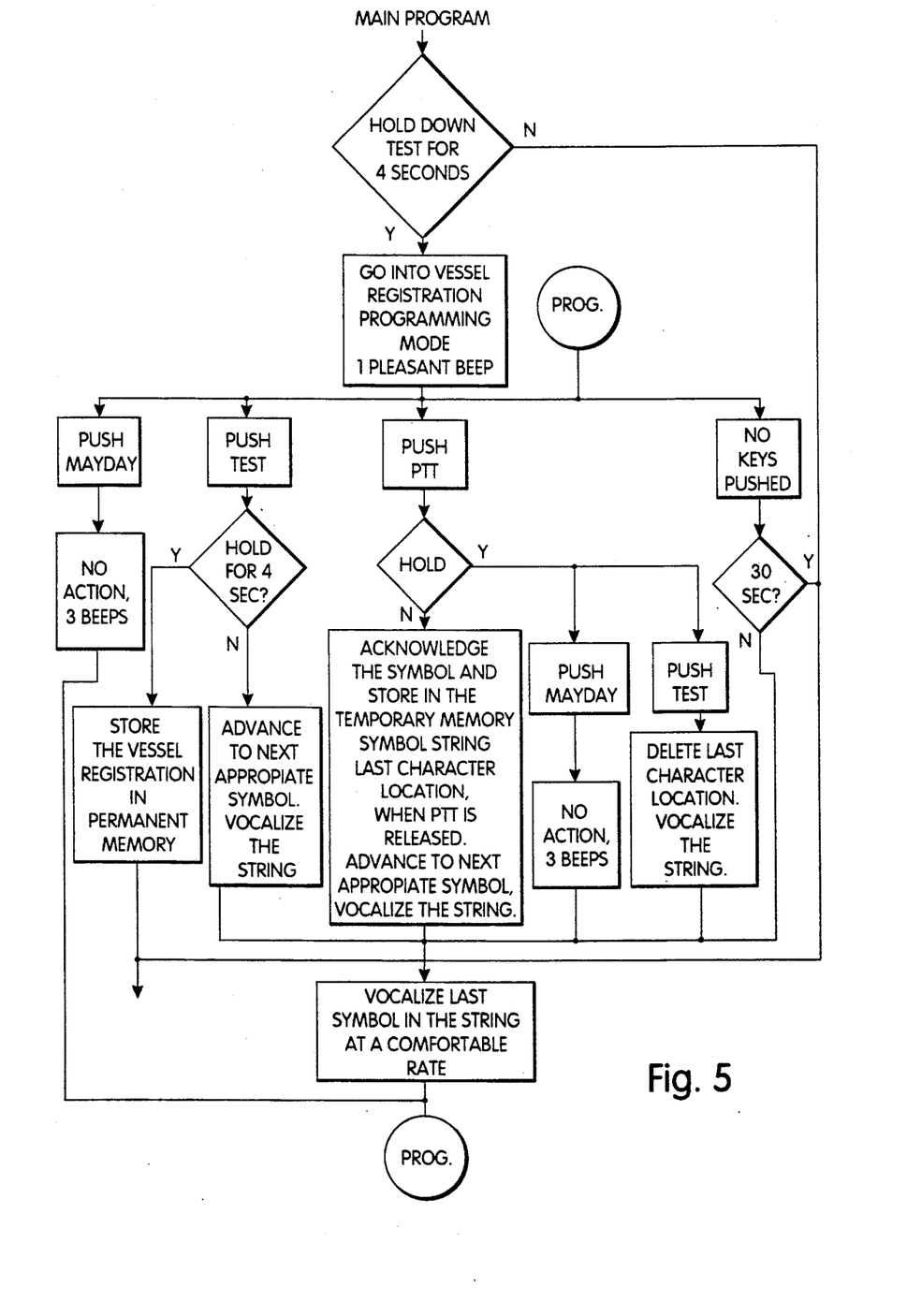
FIG. 5 is a flow chart illustrating a method of programming a vessel identification number or other number into an emergency vessel location system through the utilization of a verbal scroll and the TEST, and Push-To-Talk switches located on the microphone of FIG. 1.

Referring now to FIG. 5, a flow chart is indicated showing one programming method for programming in a verbally scrolled sequence utilizing the Push-To-Talk and test keys on the mayday microphone of FIG. 1.

As can be seen, the main program is initiated by holding down the TEST button for four seconds. Upon detection of such a condition the program goes into the vessel registration programming mode and issues a pleasant sounding beep. A push of the TEST button for less than four seconds results in advancing to the next appropriate symbol, which in one embodiment is the letter "A". If this letter, when verbalized is selected, it is selected by the Push-TO-Talk button which acknowledges that the symbol verbalized is the correct one and stores this symbol in a temporary memory to provide the first of a symbol string, with the symbol being provided in the last character location when the Push-To-Talk key is released. The automatic action is to advance through the next symbol to be verbalized such as, for instance, the letter "B". If "B" is not the appropriate required letter to be entered, the verbal scroll can be advanced by the pushing of the TEST button for less than four seconds which would then advance to "C" and on through the alphabet, followed by a number sequence of zero through nine.

Pushing the TEST button while the Push-TO-Talk button is being held results in the deletion of the last character location followed by a verbalization of the already entered string up to that point. Thus, the combination of utilizing the PUSH-TO-TALK button and the TEST button provides a back space delete function which is easily recognized and can be utilized to delete the whole stored string if desired.

After satisfactory entry of the vessel identification number and letters, they are stored in permanent memory through the holding down of the TEST button for more than four seconds.

During the programming sequence, the last symbol of the string which has been entered into temporary memory is vocalized at a comfortable rate to cue the person doing the programming so that he can enter in the next letter or number.

Should no keys be pushed within thirty seconds, the vessel registration programming mode is cancelled and the CPU returns to its main program. Should the MAYDAY button be pushed at any time during the program sequence, no action is taken and three audible beeps are emitted to warn the operator of an incorrect key entry.

Figure 6A:
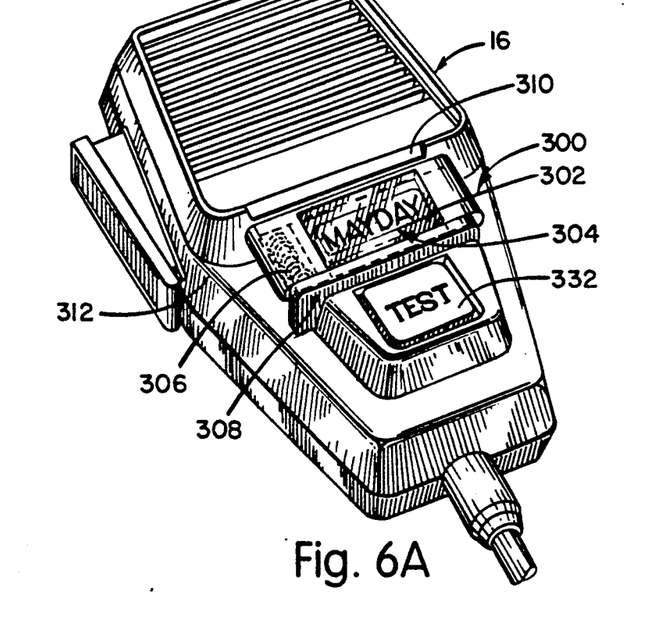
FIG. 6A is an isometric view of one embodiment of the mayday microphone of FIG. 1, illustrating a protected switch structure in which an overlying transparent member permits viewing of the mayday legend on the surface of the switch, also illustrating the positioning of a test button immediately beneath the mayday button, as well as the push to talk switch normally utilized with the microphone; and, FIG. 6B is a diagrammatic view of the microphone of FIG. 6A, illustrating the lifting of the transparent portion of the protected switch, also showing the spring loaded transparent lever which normally overlies the mayday button to prevent accidental access.

Referring now to FIG. 6, in one embodiment mayday microphone 16 may be provided with a protected switch 300 in the form of a transparent overlying latch member 302 which overlies the top legend bearing portion 304 of an underlying switch. This switch has the "mayday" legend on its top surface which is visible through the overlying and physically occluding structure. In this embodiment this structure is a pivoted transparent lever pivoted about a pivot 306, in which the lever lies in a channel defined by an upstanding member 308 at its bottom and an upstanding member 310 so that the lever lies within its own channel. It is spring biased by spring 312 so that it is urged towards the switch face, thereby covering it at all normal times.

It is the purpose of this transparent occluding member to prevent accidental or unintentional activation of the mayday switch since the transparent lever is sufficiently rigid to prevent depression of the underlying switch. Nonetheless the mayday legend is clearly visible at the mayday microphone.

Figure 6B:
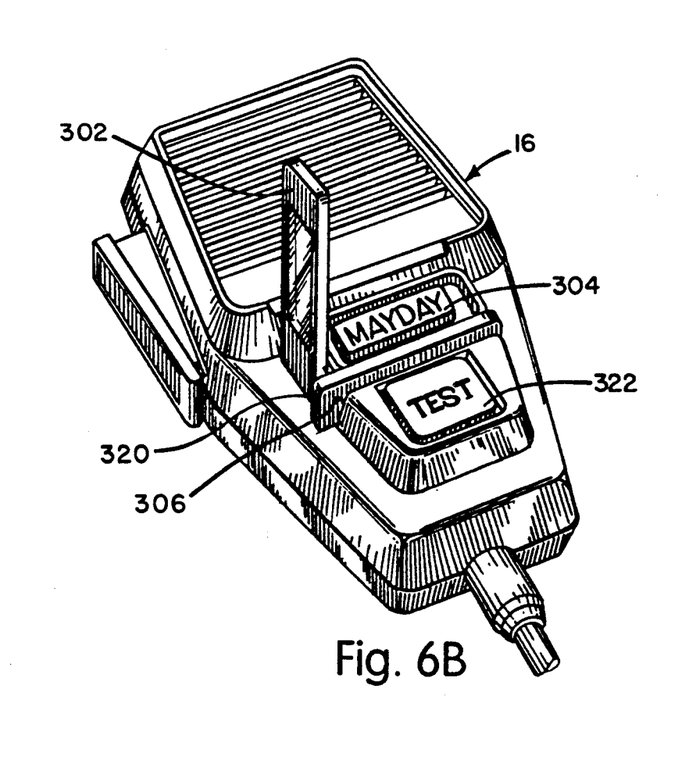

In operation, and referring now to FIG. 6B, lever 302 is raised with one hand either by depression on point 320 to the outbound side of pivot 306 or raised by a finger of the left hand so as to expose mayday switch 304 as illustrated.

It will be appreciated that this is a protective switch in the sense that two hands are necessary, or two motions are necessary in order to expose the mayday switch that it may be depressed. The utilization of a transparent stiff occluding member over the mayday switch whether it be lever operated, or removable in some manner such as by sliding from its position over the mayday switch provides a unique protected switch assembly adaptable for use on the microphone; yet it is easily activated in times of emergency.

As can be seen in both FIGS. 6A and 6B, the aforementioned TEST switch here shown by reference character 322 is located beneath the MAYDAY switch and is clearly labeled to prevent confusion. It is noted that this TEST switch is not provided with a protective cover which further differentiates the MAYDAY switch from any other switches on the microphone.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. Apparatus for protecting a finger-depressable switch from accidental activation, said switch having a legend on a top surface thereof, comprising:
   a non-frangible switch covering member including a lever having a transparent portion thereof adapted to overlie said switch such that said switch legend is readable through said transparent portion;
   means including a spring-loaded pivot to one side of said lever for removably mounting said member over said switch such that in a protected position said member is in a position over said switch and is not movable away from said switch by other than manual means; and such that in an unprotected position, said member is manually moved away from its covering position, whereby depression of said switch is prevented as long as said lever covers said switch and,
   spaced apart guard projections positioned to either side of said lever along the length thereof such that in its protected position, said lever lies over said switch between and below said guard projections.

2. The apparatus of claim 1 wherein a portion of said lever extends beyond said pivot away from said switch such that said lever may be raised by manually depressing said portion of said lever.

3. The apparatus of claim 1 and further including a microphone, said switch and said switch covering member being mounted on said microphone.

4. The apparatus of claim 1 including in combination therewith an emergency location system adapted to broadcast an emergency message responsive to depression of said switch, said apparatus preventing accidental actuation of said system by said switch.

5. The apparatus of claim 1 wherein said member is a pivoted lever and further including latching means for releasably securing said lever over said switch.

6. The apparatus of claim 1 wherein said mounting means includes means permitting rotation of said member away from said switch to effectuate said unprotected position.

7. The apparatus of claim 1 wherein said mounting means includes means permitting sliding of said member away from said switch to effectuate said unprotected position.

8. Apparatus for protecting a finger-depressable switch from accidental activation, comprising:
   a non-frangible switch covering member including a lever having a portion thereof adapted to overlie said switch;

means including a spring-loaded pivot to one side of said lever for removably mounting said member over said switch such that in a protected position said member is in a position over said switch and is not movable away from said switch by other than manual means; and such that in an unprotected position, said member is manually moved away from its covering position, whereby depression of said switch is prevented as long as said lever covers said switch, and, spaced apart guard projections positioned to either side of said lever along the length thereof such that in its protected position, said lever lies over said switch between and below said guard projections.

* * * * *